United States Patent
Mizumukai

(10) Patent No.: US 8,427,678 B2
(45) Date of Patent: Apr. 23, 2013

(54) FACSIMILE COMMUNICATION SYSTEM

(75) Inventor: Wataru Mizumukai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 516 days.

(21) Appl. No.: 12/610,993

(22) Filed: Nov. 2, 2009

(65) Prior Publication Data
US 2010/0110490 A1  May 6, 2010

(30) Foreign Application Priority Data

Oct. 31, 2008 (JP) ................................. 2008-280981
Sep. 28, 2009 (JP) ................................. 2009-222868

(51) Int. Cl.
*G06F 3/12* (2006.01)

(52) U.S. Cl.
USPC ........ 358/1.15; 358/1.12; 358/1.18; 358/402; 358/405; 358/407; 358/434; 358/435; 358/437; 358/441; 709/206; 235/462.01; 235/462.08; 235/462.1

(58) Field of Classification Search .................. 358/1.15, 358/400, 402, 1.12, 1.18, 405, 407, 434, 358/435, 437, 441; 709/206; 235/462.01, 235/462.08, 462.1
See application file for complete search history.

(56) References Cited

U.S. PATENT DOCUMENTS

| | | | |
|---|---|---|---|
| 6,827,279 B2 | 12/2004 | Teraura | |
| 2001/0000441 A1 * | 4/2001 | Zinkov et al. | ................ 358/1.15 |
| 2002/0170973 A1 | 11/2002 | Teraura | |
| 2003/0217274 A1 | 11/2003 | Nagatsuka | |
| 2005/0105140 A1 * | 5/2005 | Ozaki | ........................... 358/402 |
| 2006/0087690 A1 * | 4/2006 | Park et al. | ..................... 358/1.15 |
| 2007/0145138 A1 * | 6/2007 | Snyder et al. | ............ 235/462.01 |
| 2007/0230986 A1 | 10/2007 | Miyata | |
| 2008/0204802 A1 | 8/2008 | Tanimoto | |
| 2008/0204817 A1 | 8/2008 | Nakano | |
| 2008/0204818 A1 | 8/2008 | Nakano | |
| 2008/0239406 A1 | 10/2008 | Nakano | |
| 2008/0239408 A1 | 10/2008 | Urakawa | |
| 2009/0033994 A1 | 2/2009 | Urakawa et al. | |
| 2010/0110497 A1 | 5/2010 | Ohmiya | |

FOREIGN PATENT DOCUMENTS

| | | |
|---|---|---|
| JP | H08-058180 A | 3/1996 |
| JP | 2003-337683 A | 11/2003 |
| JP | 2005-151357 A | 6/2005 |
| JP | 2005-316189 A | 11/2005 |
| JP | 391203 B2 | 5/2007 |
| JP | 3912031 B2 | 5/2007 |
| JP | 2007-203701 A | 8/2007 |
| JP | 2007-268772 A | 10/2007 |
| JP | 2007-283590 A | 11/2007 |
| JP | 2008-047966 A | 2/2008 |

(Continued)

OTHER PUBLICATIONS

Japan Patent Office; Office Action for Patent Application No. JP2009-222868, dated Nov. 25, 2010.

*Primary Examiner* — Vu B Hang
(74) *Attorney, Agent, or Firm* — Baker Botts L.L.P.

(57) ABSTRACT

A facsimile communication system includes a first facsimile device that transmits image data and a second facsimile device. The second facsimile device includes a first receiving unit that receives the image data; an image-forming unit that forms an image based on the image data on a recording medium having a first storing part that is configured to store stored data; and a notifying unit that notifies the first facsimile device of the stored data.

7 Claims, 5 Drawing Sheets

FOREIGN PATENT DOCUMENTS

| | | |
|---|---|---|
| JP | 2008-113325 A | 5/2008 |
| JP | 2008-211710 A | 9/2008 |
| JP | 2008-211717 A | 9/2008 |
| JP | 2008-219075 A | 9/2008 |
| JP | 2008-244880 A | 10/2008 |
| JP | 2008-252412 A | 10/2008 |
| JP | 2008-252842 A | 10/2008 |
| JP | 2009-038628 A | 2/2009 |
| JP | 2010-109790 A | 5/2010 |
| JP | 2010-109804 A | 5/2010 |

* cited by examiner

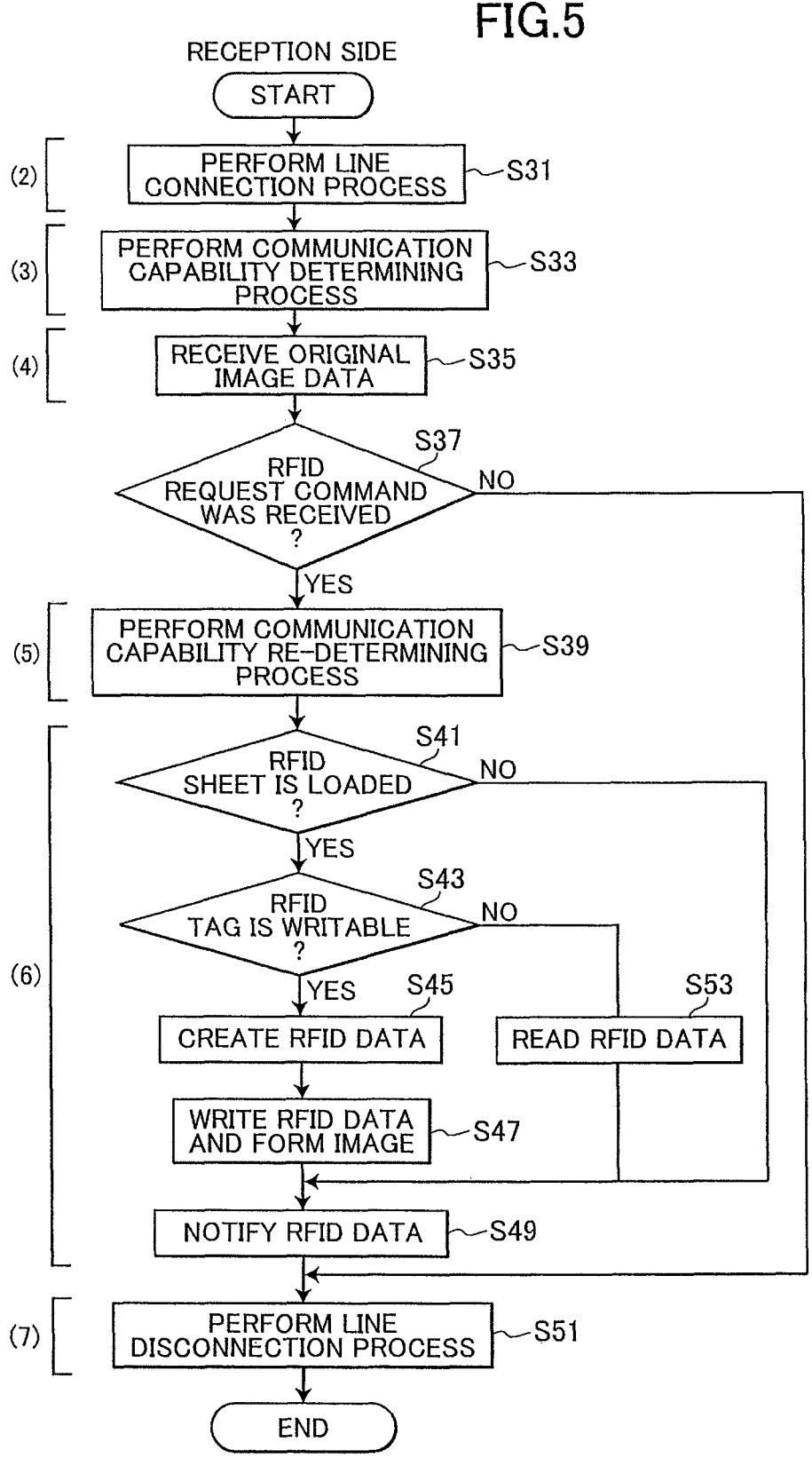

FACSIMILE COMMUNICATION SYSTEM

CROSS REFERENCE TO RELATED APPLICATION

This application claims priority from Japanese Patent Applications No. 2008-280981 filed Oct. 31, 2008 and No. 2009-222868 filed Sep. 28, 2009. The entire contents of these applications are incorporated herein by reference.

TECHNICAL FIELD

The present invention relates to a facsimile communication system, a transmission-side facsimile device, and a reception-side facsimile device.

BACKGROUND

Recording media with a built-in storage unit (paper with a radio frequency identification (RFID) tag, for example) have been conventionally used in facsimile-type image-forming systems and the like. For example, in one such system a transmission-side facsimile device reads an image as image data from a sheet of paper having an RFID tag, reads the content stored in the RFID tag as RFID data, and transmits this data to a reception-side facsimile device. Upon receiving this data, the reception-side facsimile device forms an image on paper having an RFID tag that is loaded in the reception-side facsimile device based on the received image data, and stores the received RFID data in the RFID tag of the same sheet.

SUMMARY

However, in conventional facsimile communication systems, the transmission-side facsimile device has been unable to determine what type of RFID paper was used on the reception-side facsimile device when printing images based on the original image data.

In view of the foregoing, it is an object of the present invention to provide a facsimile communication system, a transmission-side facsimile device, and a reception-side facsimile device whereby the transmission-side can determine what type of recording medium having a storage unit was used when forming images based on image data transmitted from the transmission side.

In order to attain the above and other objects, the invention provides a facsimile communication system including a first facsimile device that transmits image data and a second facsimile device. The second facsimile device includes a first receiving unit that receives the image data; an image-forming unit that forms an image based on the image data on a recording medium having a first storing part that is configured to store stored data; and a notifying unit that notifies the first facsimile device of the stored data.

Another aspect of the present invention provides a facsimile device including a receiving unit, an image-forming unit, and a notifying unit. The first receiving unit receives image data from a transmission-side facsimile device. The image-forming unit forms an image based on the image data on a recording medium having a storing part that is configured to store stored data. The notifying unit notifies the transmission-side facsimile device of the stored data.

Another aspect of the present invention provides a facsimile device including an image scanning unit, a transmitting unit, a receiving unit, and a data writing unit. The image scanning unit scans an original image on an original document having a storing part to form image data. The transmitting unit transmits the image data to a reception-side facsimile device. The receiving unit receives data from the reception-side facsimile device. The data writing unit writes the data received by the receiving unit to the storing part.

BRIEF DESCRIPTION OF THE DRAWINGS

The particular features and advantages of the invention as well as other objects will become apparent from the following description taken in connection with the accompanying drawings, in which:

FIG. 5 is a flowchart illustrating steps in the facsimile communication process executed on a reception-side MFP.

DETAILED DESCRIPTION

Next, a preferred embodiment of the present invention will be described while referring to the accompanying drawings.

<Facsimile Communication System>

Figure 1:
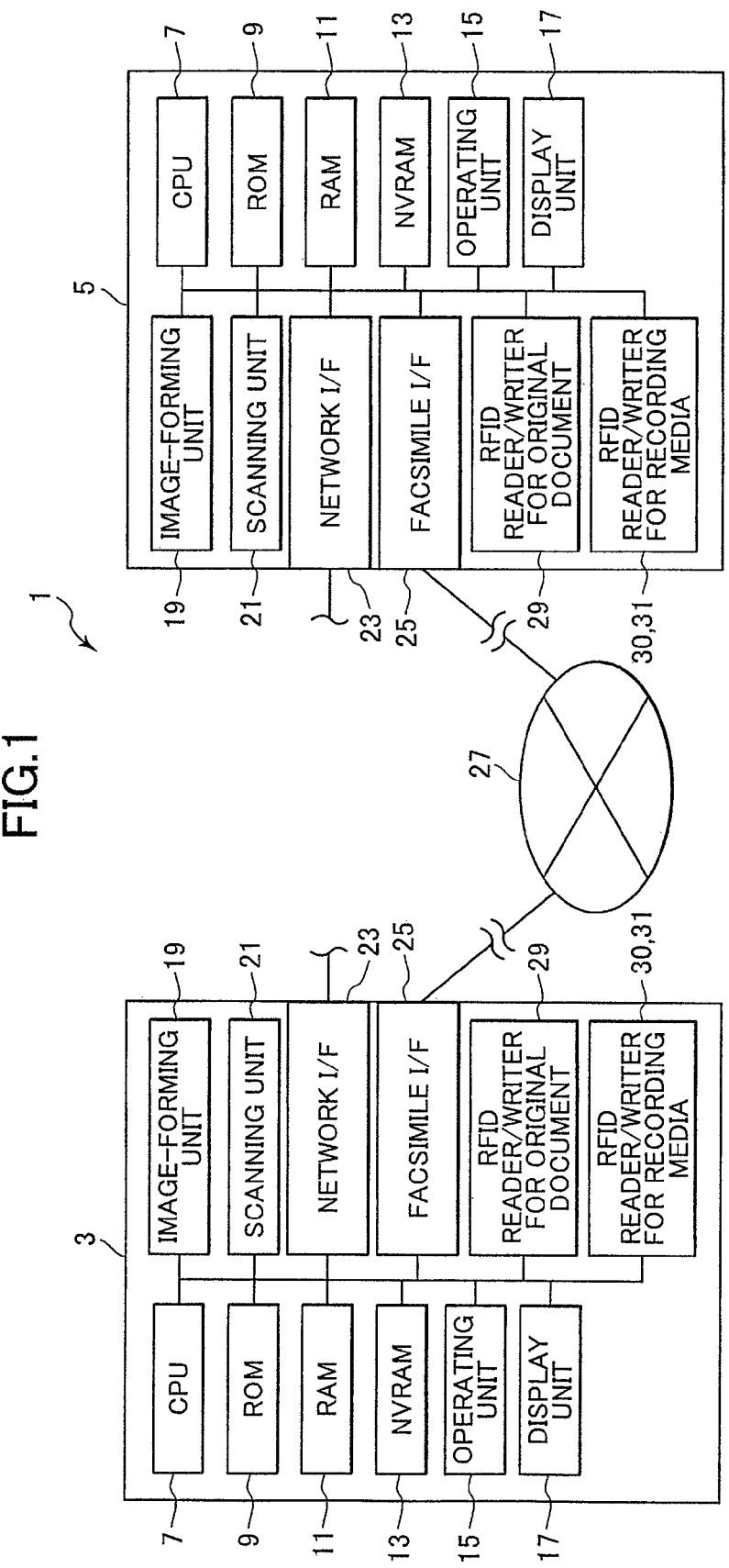
FIG. 1 is a block diagram showing an overall structure of a facsimile communication system according to a preferred embodiment of the present invention.

FIG. 1 is a block diagram showing the overall structure of a facsimile communication system 1 according to a preferred embodiment of the present invention. The facsimile communication system 1 is configured of two multifunction peripherals (MFPs) 3 and 5, each having at least a facsimile communication function. The MFPs 3 and 5 are capable of exchanging image data (facsimile data) with each other. For the sake of simplicity, the following description will cover the process in which the MFP 3 transmits image data to the MFP 5, and the MFP 5 forms (prints) an image based on the image data received from the MFP 3. Accordingly, the MFP 3 will also be referred to as the transmission-side MFP 3 and the MFP 5 as the reception-side MFP 5.

The hardware configurations of the MFPs 3 and 5 may differ, provided that both have at least a facsimile function. However, to simplify the description of the preferred embodiment, the MFPs 3 and 5 will share the same basic hardware configuration that includes a printer function, scanner function, and copier function in addition to the facsimile function. In the preferred embodiment, each of the MFPs 3 and 5 has a CPU 7, a ROM 9, a RAM 11, a NVRAM 13 (nonvolatile memory), an operating unit 15, a display unit 17, an image-forming unit 19, and a scanning unit 21.

The ROM 9 stores programs for executing various operations on the MFPs 3 and 5, such as a facsimile communication process described later. The CPU 7 reads programs from the ROM 9 and executes the programs to perform various control processes while storing the results of operations in the RAM 11 or NVRAM 13. The operating unit 15 includes a plurality of buttons by which the user can perform input operations. The display unit 17 includes a liquid crystal display and lamps for displaying configuration screens, the status of device operations, and the like.

Each of the MFPs 3 and 5 also includes a network interface 23 and a facsimile interface 25. The network interface 23 connects the MFP 3 or 5 to an external computer (not shown)

or the like via a network, enabling bi-directional communications between the two devices. The facsimile interface 25 connects the MFP 3 or 5 to another facsimile device via a public telephone network 27, enabling facsimile communications between the two devices.

Each of the MFPs 3 and 5 also includes a first RFID reader/writer 29 for reading from or writing to RFID tags in original documents. Further, each of the MFPs 3 and 5 includes a second RFID reader/writer 31 and a third RFID reader/writer 30 for reading from or writing to RFID tags in sheet-like recording media. These RFID reader/writers will be described later in greater detail.

<Structure of the Multifunction Peripheral>

Figure 2:
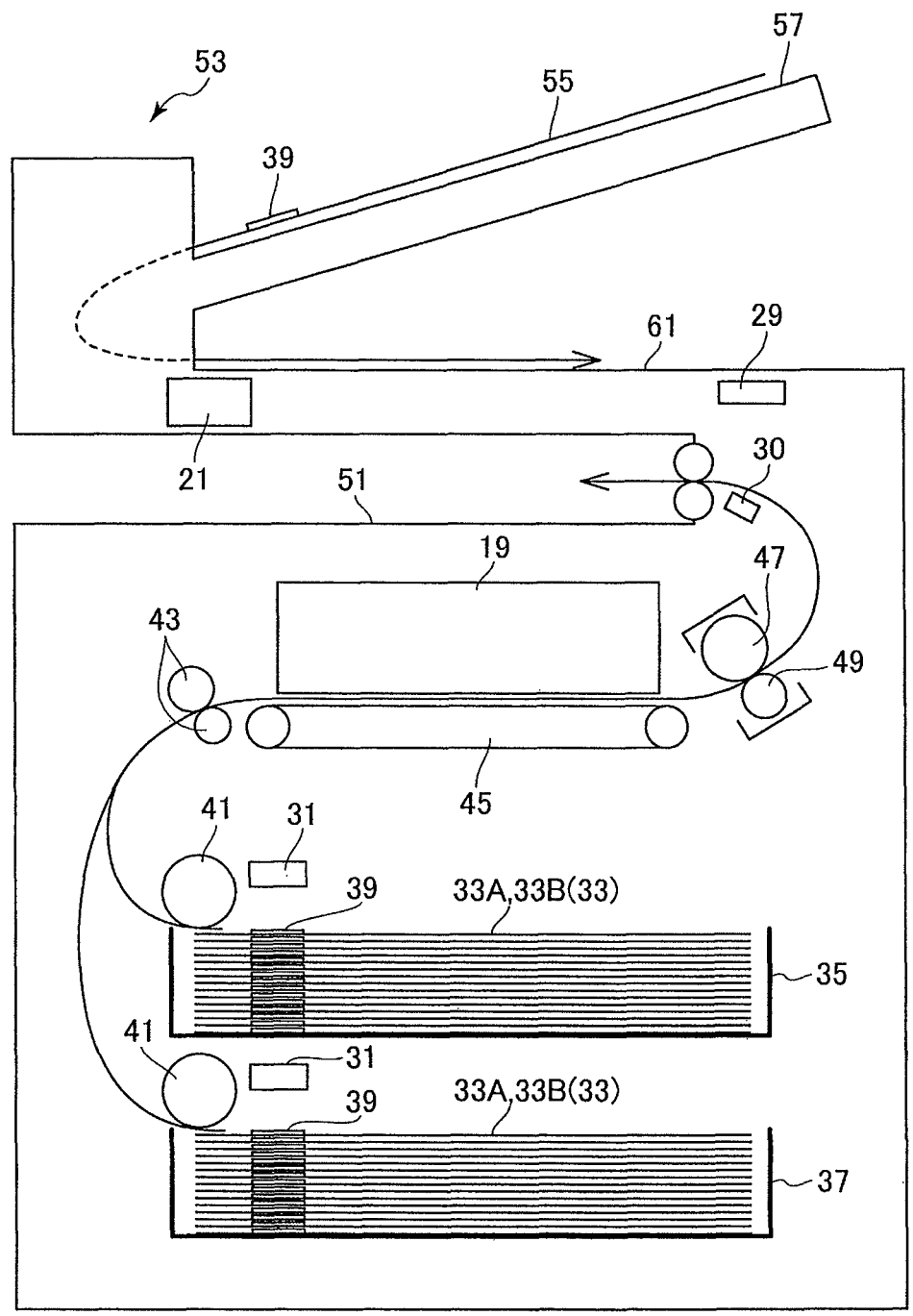
FIG. 2 conceptually illustrates an internal structure of an MFP according to the preferred embodiment of the present invention.

FIG. 2 conceptually illustrates the internal structure of the transmission-side MFP 3, for example, while the reception-side MFP 5 has the same structure in the preferred embodiment. One or more trays (two trays 35 and 37 in the preferred embodiment) are provided in the bottom section of the transmission-side MFP 3. The trays 35 and 37 accommodate sheets 33 of a paper or other recording medium on which images are to be formed. The sheets 33 include sheets with RFID tags 39 (hereinafter referred to as "RFID sheets 33A") and normal sheets without RFID tags 39 (hereinafter referred to as "normal sheets 33B"). The RFID sheets 33A may be configured of RFID tags embedded in sheets 33 or RFID tags attached to the surfaces of the sheets 33.

The second RFID reader/writers 31 described above are provided one for each of the trays 35 and 37. Each second RFID reader/writer 31 can communicate wirelessly with (read data from or write data to) RFID tags 39 in RFID sheets 33A accommodated in the respective trays 35 and 37 through radio waves emitted from an antenna (not shown). Hence, if the sheet 33 accommodated in the respective trays 35 and 37 is a RFID sheet 33A, the RFID reader/writer 31 can exchange data with the RFID tag 39 in the RFID sheet 33A.

A pickup roller 41 disposed above one end of each of the trays 35 and 37 picks up and conveys sheets 33 accommodated in the respective trays 35 and 37 to a pair of registration rollers 43 one sheet at a time. When a sheet 33 reaches the registration rollers 43, the registration rollers 43 adjust the registration of the sheet 33 and convey the sheet 33 onto a conveying belt 45 at a prescribed timing. The conveying belt 45 continues to convey the sheet 33 while the image-forming unit 19 forms a monochrome or color image thereon based on image data received in a facsimile communication, for example. The image formed on the surface of the sheet 33 is subsequently fixed to the sheet by heat as the sheet 33 is interposed between a heating roller 47 and a pressure roller 49 in a fixing unit disposed downstream of the conveying belt 45. The sheet 33 is subsequently discharged onto a discharge tray 51.

The third RFID reader/writer 30 described above is disposed near the conveying path along which the sheets 33 are conveyed between the trays 35 and 37 and the discharge tray 51 (downstream of the fixing unit in the example of FIG. 2), for example. Hence, if the sheet 33 passing through the fixing unit is a RFID sheet 33A, the third RFID reader/writer 30 can exchange data with the RFID tag 39 in the RFID sheet 33A through wireless communications.

A document-reading unit 53 is disposed above the discharge tray 51. The document-reading unit 53 includes a document tray 57 in which an original document 55 is set. The original document 55 may include one or more RFID sheets 33A on the surfaces of which original images are formed, and/or one or more normal sheets 33B on the surfaces of which original images are formed. The document-reading unit 53 also includes a conveying mechanism (not shown) for conveying the original document 55, and the scanning unit 21 disposed near the path along which the original document 55 is conveyed. The conveying mechanism conveys the original document 55 set in the document tray 57 through the scanning region of the scanning unit 21 and subsequently discharges the original document 55 on a document discharge tray 61. The scanning unit 21 generates image data by reading images formed on the original document 55 as the original document 55 is conveyed thereby, and transmits this image data to the CPU 7.

The first RFID reader/writer 29 for original documents is disposed in the document discharge tray 61. If the sheet of the original document 55 discharged on the document discharge tray 61 is a RFID sheet 33A, the first RFID reader/writer 29 can exchange data with the RFID tag 39 provided in the RFID sheet 33A through wireless communications.

<Facsimile Communication>

Figure 3:
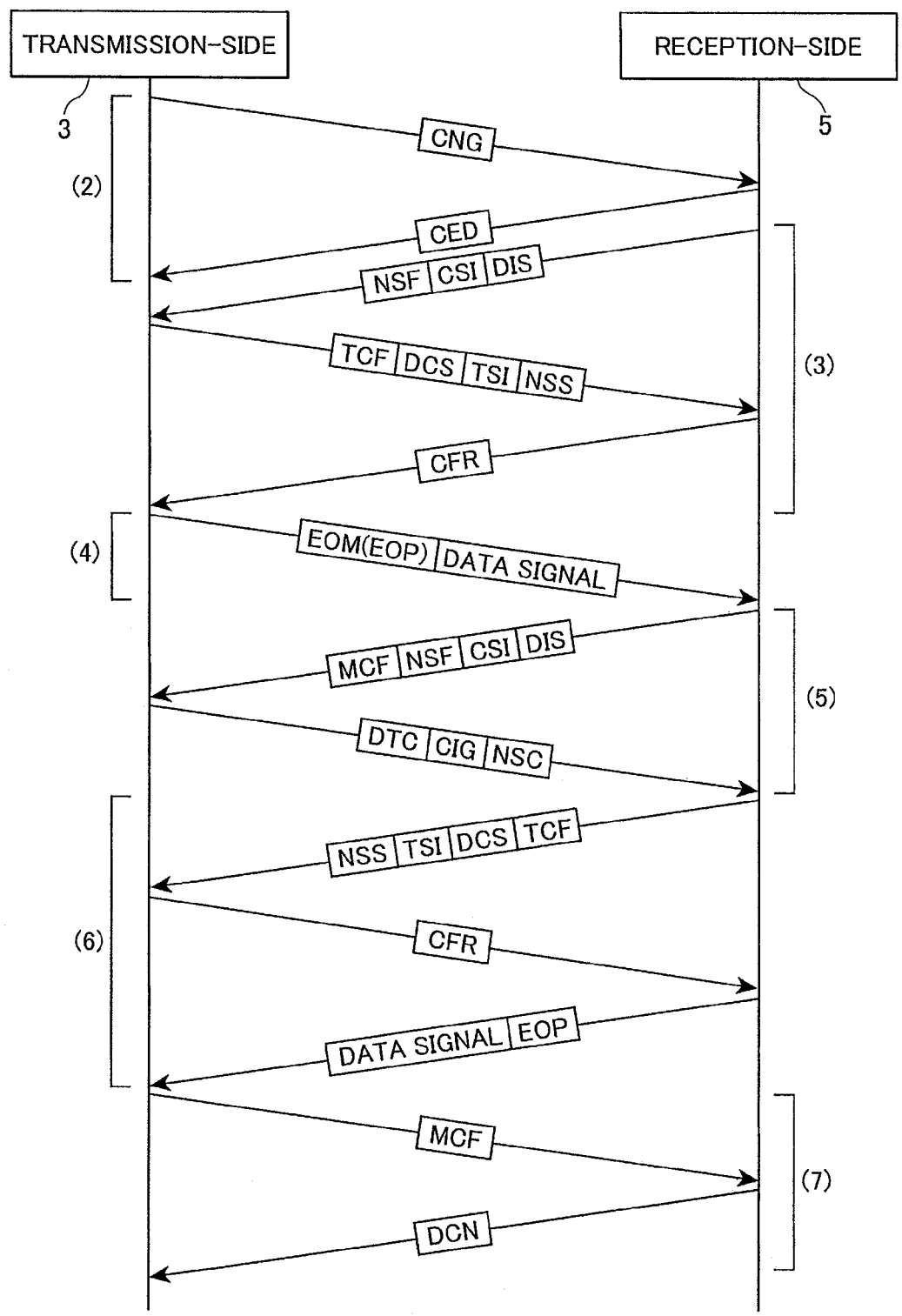
FIG. 3 shows a sequence of operations performed during a facsimile communication.
Figure 4:
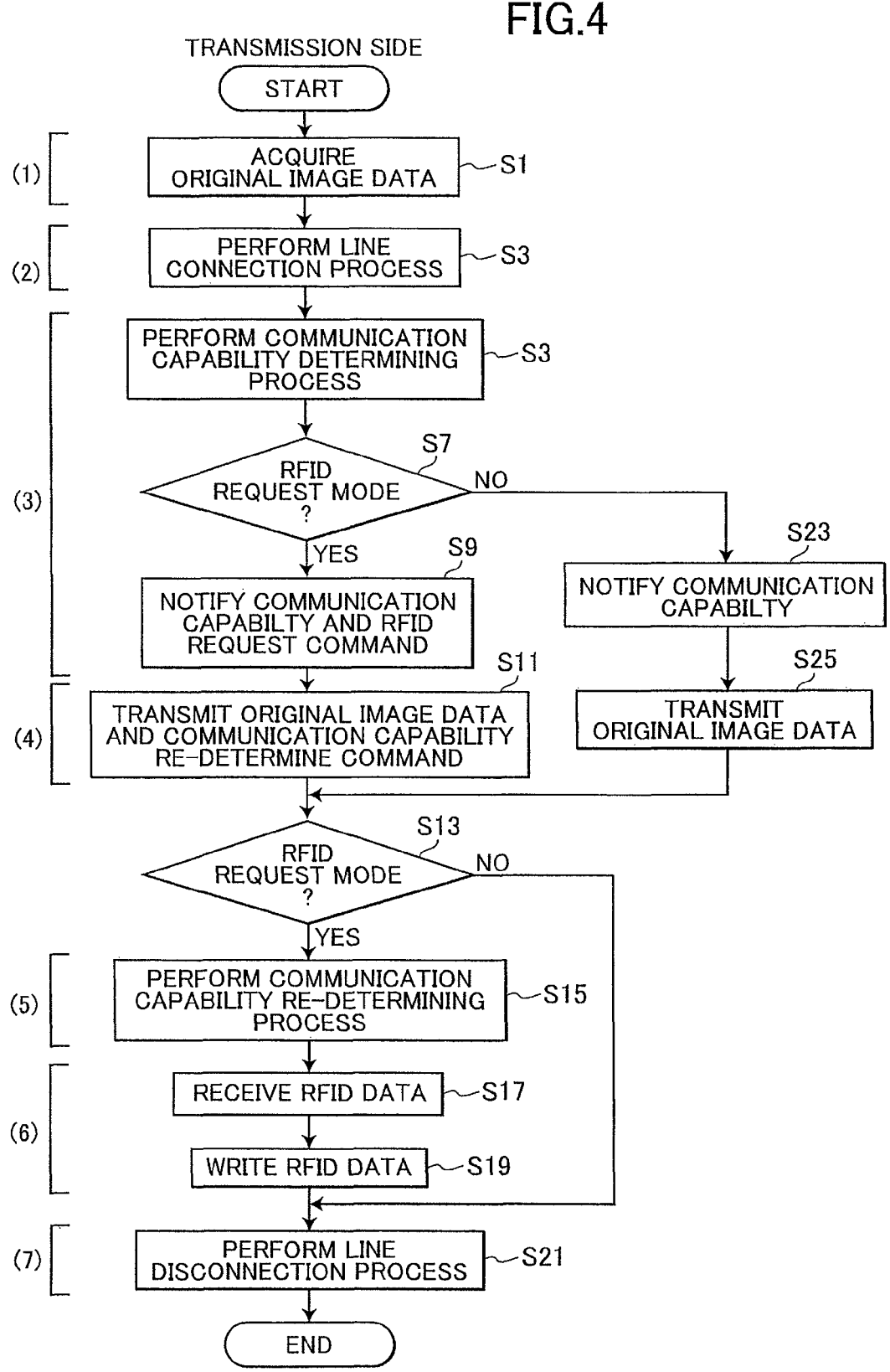
FIG. 4 is a flowchart illustrating steps in the facsimile communication process executed on a transmission-side MFP.

FIG. 3 shows the sequence of operations performed during a facsimile communication. FIG. 4 is a flowchart illustrating steps in the facsimile communication executed on the transmission-side MFP 3, and FIG. 5 is a flowchart illustrating steps in the process executed on the reception-side MFP 5. Execution of this process enables the transmission-side MFP 3 to detect the type of RFID sheet 33A on which the reception-side MFP 5 forms images of the original document based on image data transmitted from the transmission-side MFP 3. The numbers in parentheses in FIGS. 3 through 5 are stage numbers to be described next.

The facsimile communication starts when the user on the transmission side sets one or a plurality of sheets of the original document 55 having the RFID sheets 33A in the document tray 57 of the transmission-side MFP 3 and performs an operation on the operating unit 15 for initiating a facsimile transmission. At this time, the user can specify an RFID request mode for requesting RFID data from the reception-side MFP 5, or a normal mode for not requesting such RFID data. The CPU 7 of the transmission-side MFP 3 executes the process shown in FIG. 4 based on these settings and operations.

(1) Original Image Reading Stage

In S1 the CPU 7 of the transmission-side MFP 3 acquires original image data generated by the scanning unit 21 while conveying sheets of the original document 55 through the scanning region of the scanning unit 21, and temporarily stores this data in a buffer region of the NVRAM 13, for example. Thereafter, the process enters the line connection stage.

(2) Line Connection Stage

In the line connection stage, in S3 of FIG. 4 and S31 of FIG. 5, the MFPs 3 and 5 perform a lone connection process for establishing a connection therebetween. More specifically, as shown in FIG. 3, the CPU 7 of the transmission-side MFP 3 transmits a CNG (call) signal to a telephone exchange via the facsimile interface 25, whereby the telephone exchange calls the reception-side MFP 5. In response to this case, the CPU 7 of the reception-side MFP 5 returns a CED (response) signal to the telephone exchange via the facsimile interface 25, at which point the process enters the preliminary communication stage (negotiation).

(3) Preliminary Communication Stage

In the preliminary communication stage, S5 of FIG. 4 and S33 of FIG. 5, the MFPs 3 and 5 perform a communication capability determining process for determining the communication capabilities of each other for performing facsimile communications. More specifically, as shown in FIG. 3, the CPU 7 of the reception-side MFP 5 transmits an NSF signal, CSI signal, and DIS signal to the transmission-side MFP 3.

The NSF signal stands for a "non-standard facilities" signal, and is freely set based on proprietary communication capabilities (transmission protocol, transfer rate, and compression format, for example) of the reception-side MFP 5 and other data. In the preferred embodiment, the RFID request mode or the normal mode is set in the NSF signal. The CSI signal stands for a "called station identification" signal. The DIS signal is a "digital identification" signal for describing standard communication capabilities supported by the reception-side MFP 5 among preset standards.

Upon receiving these signals from the reception-side MFP 5, in S5 the CPU 7 of the transmission-side MFP 3 sets communication capabilities that will be used for the current session from among the communication capabilities supported by the reception-side MFP 5 based on the DIS signal and the NSF signal. In S7 the CPU 7 determines whether the RFID request mode described above is set based on the NSF signal. If the RFID request mode is set (S7: YES), in S9 the CPU 7 returns to the reception-side MFP 5 the determined communication capabilities set in S5, and an RFID request command. More specifically, as shown in FIG. 3, the transmission-side MFP 3 returns an NSS signal, TSI signal, DCS signal, and TCF signal to the reception-side MFP 5.

The NSS signal stands for a "non-standard setup" signal and is set based on the NSF signal. The CPU 7 of the transmission-side MFP 3 sets the RFID request command in the NSS signal and returns the NSS signal. The TSI signal stands for a "transmission subscriber identification" signal. The DCS signal is a digital command signal for notifying the communication capabilities that is determined in S5 on the transmission-side MFP 3, to the reception-side MFP 5. The TCF signal stands for a "training check" signal. Upon receiving this TCF signal, the CPU 7 of the reception-side MFP 5 transmits a CFR signal to the transmission-side MFP 3 to notify the transmission-side MFP 3 that data was received normally. At this point, the communication capabilities are complete, and the process enters the original image transmission/reception stage.

On the other hand, if the normal mode has been set (S7: NO), in S23 the CPU 7 of the transmission-side MFP 3 returns the NSS signal, TSI signal, DCS signal, and TCF signal to the reception-side MFP 5 without including an RFID request command.

(4) Original Image Transmission/Reception Stage

In the RFID request mode, after confirming that the CFR signal was received from the reception-side MFP 5, in S11 the CPU 7 of the transmission-side MFP 3 transmits the original image data generated in the original image reading stage and a command to re-determine communication capabilities to the reception-side MFP 5. More specifically, as shown in FIG. 3, the CPU 7 of the transmission-side MFP 3 transmits a data signal including the original image data, and an EOM signal indicating the command to re-determine communication capabilities to the reception-side MFP 5. During the normal mode, in S25 the CPU 7 of the transmission-side MFP 3 transmits the original image data and an EOP signal to the reception-side MFP 5, but does not transmit the EOM signal. The EOP signal indicates the end of the data signal packet.

In S13, the CPU 7 of the transmission-side MFP 3 determines whether the RFID request mode described above is set. If the RFID request mode is set (S13: YES), the CPU 7 goes to S15 in FIG. 4 and the process enters a communication capability re-determining stage.

On the other hand, if the normal mode is set (S 13: NO), CPU 7 skips to S21 without executing the processes for S15 through S19 of FIG. 4 and the process enters a line disconnection stage.

(5) Communication Capability Re-Determining Stage

After receiving the original image data in S35, in S37 the CPU 7 of the reception-side MFP 5 determines whether an RFID request command was received in the communication capability determining process (S33). If an RFID request command was received (S37: YES), in S39 the CPU 7 executes the communication capability re-determining process according to the EOM signal. Specifically, as shown in FIG. 3, the CPU 7 of the reception-side MFP 5 transmits a MCF signal, NSF signal, CSI signal, and DIS signal to the transmission-side MFP 3. The MCF signal serves to notify the transmission-side MFP 3 that the original image data was received normally.

In response to receiving these signals, in S15 the CPU 7 of the transmission-side MFP 3 determines communication capabilities supported by the transmission-side MFP 3 from among the communication capabilities supported by the reception-side MFP 5 based on the DIS signal and the NSF signal. The transmission-side MFP 3 returns an NSC signal, CIG signal, and DTC signal to the reception-side MFP 5, as shown in FIG. 3. The NSC signal is a "non-standard facilities command" signal and is sent in response to the NSF signal, and the CIG signal is a "calling subscriber identification" signal. The DTC signal is a "digital transmit command" signal for notifying the reception-side MFP 5 of the above communication capabilities supported by the transmission-side MFP 3. The CPU 7 of the reception-side MFP 5 sets the highest communication capability based on the DTC signal. Subsequently, the process enters the RFID data notification stage.

(6) RFID Data Notification Stage

In the RFID data notification stage, the reception-side MFP 5 notifies the transmission-side MFP 3 of the content of RFID data stored in the RFID tag 39 of the RFID sheet 33A on which the reception-side MFP 5 is to form the original image (image based on the original image data transmitted from the transmission-side MFP 3).

Specifically, in S41 the CPU 7 of the reception-side MFP 5 determines whether RFID sheets 33A are loaded in either the tray 35 or 37. The CPU 7 may make this determination based on configuration data related to the type of sheets 33 that should be loaded in the trays 35 and 37, for example, or based on detection results from sensors (not shown) used to detect the presence of the sheets 33 or the results of wireless communications by the second RFID reader/writers 31 (e.g., whether there was a response to wireless communications with the sheets 33 in the trays 35 and 37).

If RFID sheets 33A are loaded in one of the trays (S41: YES), in S43 the CPU 7 uses the corresponding second RFID reader/writer 31 to determine whether it is possible to write to the RFID tags 39 of the RFID sheets 33A or whether the RFID tags 39 are read-only.

A. When the RFID Tags of the RFID Sheet is Writable

If the second RFID reader/writer 31 can write to the RFID tags 39 of the RFID sheet 33A (S43: YES), in S45 the CPU 7 of the reception-side MFP 5 creates control data (RFID dara) to be managed by the reception-side MFP 5. The control data may be data generated based on any data that can be used for identification, tracking, or verification, such as unique data identifying each RFID sheet 33A (a serial number or the like uniquely set for each RFID tag 39, for example), data related to the transmission or reception date and time, and transmission data acquired from the transmission-side MFP 3 (data identifying the sender, for example). In S47 the CPU 7 conveys the topmost RFID sheet 33A from the tray 35 (or 37) to the image-forming unit 19 and forms an image on the RFID sheet 33A with the image-forming unit 19. Subsequently, the CPU 7 uses the third RFID reader/writer 30 to write the control data to the RFID tag 39 of the conveyed RFID sheet 33A.

In S49 the CPU 7 notifies the transmission-side MFP 3 of the data written by the third RFID reader/writer 30 as the RFID data. Here, the "data written by the third RFID reader/writer 30" may be data that the third RFID reader/writer 30 writes to the RFID tag 39 and subsequently re-reads therefrom (i.e., the actually written data), or may be the same content as the control data or content corresponding to this control data when the third RFID reader/writer 30 completed the writing operation without problem but has not verified the content of the data actually written. The CPU 7 also transmits correlation data associating the RFID data with the specification data of the original image data (a filename, for example).

More specifically, the CPU 7 of the reception-side MFP 5 transmits an NSS signal, TSI signal, DCS signal, and TCF signal to the transmission-side MFP 3, as illustrated in FIG. 3. The CPU 7 adds a command to the NSS signal for notifying the transmission-side MFP 3 that RFID data will be included in a subsequent data signal.

The DCS signal serves to notify the transmission-side MFP 3 of the communication capability set in S15 by the reception-side MFP 5. Upon receiving a CFR signal from the transmission-side MFP 3 in response, the CPU 7 of the reception-side MFP 5 transmits to the transmission-side MFP 3 a data signal including the RFID data and the specification data for the original image data (a filename, for example), and an EOP signal.

Consequently, in S17 the CPU 7 of the transmission-side MFP 3 receives the data signal and in S19 uses the first RFID reader/writer 29 to write the RFID data to the RFID tag 39 of the RFID sheet 33A (original document 55) discharged on the document discharge tray 61. When writing data, the first RFID reader/writer 29 may overwrite any data on the RFID tag 39 or may add the RFID data to the existing data.

B. When the RFID Tags of the RFID Sheet is Read-Only

On the other hand, if the CPU 7 of the reception-side MFP 5 determines in S43 of FIG. 5 that the RFID tag 39 of the RFID sheet 33A is read-only (S43: NO), in S53 the CPU 7 reads identification data prewritten in the RFID tag 39 (a serial number or the like uniquely set for each RFID tag 39, for example). Subsequently, in S49 the CPU 7 transmits the prewritten data content to the transmission-side MFP 3 as the content of the RFID data. Consequently, in S17 the CPU 7 of the transmission-side MFP 3 receives the data and in S19 uses the first RFID reader/writer 29 to write the RFID data to the RFID tag 39 of the RFID sheet 33A (original document 55).

C. When no RFID Sheets are Loaded in the Trays

If the CPU 7 of the reception-side MFP 5 determines in S41 of FIG. 5 that no RFID sheets 33A are loaded in the trays (S41: NO), in S49 the CPU 7 includes data in the NSS signal indicating that the reception-side MFP 5 cannot respond to the RFID request. In such a case, the CPU 7 of the transmission-side MFP 3 skips to S21 without executing S17 and S19 of FIG. 4. After completing the RFID data notification stage, the process enters the line disconnection stage. Further, the CPU 7 of the transmission-side MFP 3 may use the first RFID reader/writer 29 to write data to the RFID tag 39 of the RFID sheet 33A (original document 55) discharged on the document discharge tray 61 indicating that no RFID sheets 33A were loaded on the reception side.

Further, if an RFID request was not received in S37 of FIG. 5 (S37: NO), in S51 the CPU 7 of the reception-side MFP 5 executes a line disconnection process and subsequently controls the image-forming unit 19 to form images on the sheets 33 loaded in the trays 35 and 37 based on the original image data.

(7) Line Disconnection Stage

In the line disconnection stage, in S21 of FIG. 4 and S51 of FIG. 5, the line between the transmission-side MFP 3 and reception-side MFP 5 is disconnected when the transmission-side MFP 3 transmits an MCF signal and receives a DCN signal from the reception-side MFP 5 in response. This ends the facsimile communication process.

Effects of the Embodiment (1) According to the preferred embodiment, the reception-side MFP 5 notifies the transmission-side MFP 3 of RFID data stored in the RFID tag 39 of the RFID sheet 33A on which the reception-side MFP 5 will form images of the original document. In this way, the transmission-side MFP 3 can learn that the RFID data content provided in the notification is stored in the RFID tag 39 of the RFID sheet 33A on which the original image will be formed.

Therefore, the organizer of an event can send original image data constituting an invitation to the event from the transmission-side MFP 3 to targeted invitees on reception-side MFPs 5, for example. When each reception-side MFP 5 notifies the transmission-side MFP 3 of the content of RFID data in the RFID tag of an RFID sheet loaded on the reception-side MFP 5, the organizer can learn what content is stored in the RFID tag 39 of the invitation (RFID sheet 33A) created on the invitee side. Accordingly, when the invitee brings the invitation to the venue of the event, the organizer can determine the authenticity of the invitation by cross-checking the content known by the organizer (the RFID data stored in the RFID tag 39 of the RFID sheet 33A (original document 55)) with the content stored in the RFID tag 39 of the invitation.

(2) Further, if the RFID tag 39 of the RFID sheet 33A loaded in the reception-side MFP 5 is read-only (S43: NO), the reception-side MFP 5 transmits the content of identification data prewritten in the RFID tag 39 to the transmission-side MFP 3 as the content of the RFID data. Hence, the transmission side can learn what type of RFID sheet 33A was used when forming the original image, even when the RFID tag 39 in the RFID sheet 33A is read-only.

(3) On the other hand, if data can be written to the RFID tag 39 of the RFID sheet 33A loaded in the reception-side MFP 5 (S43: YES), the reception-side MFP 5 transmits the content of data written by the third RFID reader/writer 30 to the transmission-side MFP 3 as the content of the RFID data. Therefore, even if the control data does not match the data actually written in the RFID tag 39 of the RFID sheet 33A for the reception-side MFP 5, such as when the control data could not be completely written to the RFID tag 39 because the RFID tag 39 of the RFID sheet 33A for the reception-side MFP 5 has a relatively small storage capacity, the transmission side can still learn what type of RFID sheet 33A was used to form the original images or what RFID data is stored in the RFID tag 39 of the RFID sheet 33A on which the reception-side formed the original images.

(4) The reception-side MFP 5 transmits to the transmission-side MFP 3 the correlation data associating the RFID data with the specification data of the original image data (a filename, for example). Accordingly, the transmission side can easily manage the content of RFID data based on this correlation data. The transmission-side MFP 3 may also display this correlation data on the display unit 17.

The CPU 7 of the transmission-side MFP 3 writes the content of the RFID data received from the reception-side MFP 5 to the RFID tag 39 of the RFID sheet 33A (original document 55) discharged on the document discharge tray 61. Hence, the transmission-side MFP 3 can integrally manage the RFID sheet 33A of the original document and data related to the type of RFID sheet 33A used for forming the original images on the reception side.

While the invention has been described in detail with reference to the embodiment thereof, it would be apparent to those skilled in the art that various changes and modifications may be made therein without departing from the spirit of the invention.

(1) While the reception-side MFP 5 creates the RFID data (stored data) itself in the preferred embodiment described above, the reception-side MFP 5 may instead use data received from the transmission-side MFP 3. For example, the transmission-side MFP 3 may read data in the RFID tag 39 of the RFID sheet 33A using the first RFID reader/writer 29 and transmit this data to the reception-side MFP 5. In this case, the data may be transmitted in the NSS signal during the preliminary communication stage ((3) in FIG. 3). Alternatively, the transmission-side MFP 3 may include data in the NSS signal transmitted in the preliminary communication stage indicating that this data will be included in a subsequently transmitted data signal and may transmit this data in the subsequent data signal during the original image transmission/reception stage ((4) in FIG. 3). Further, the RFID data (stored data) may include the control data created by the reception-side MFP 5 and the data received from the transmission-side MFP 3.

In some cases, even when the reception-side MFP 5 receives RFID data from the transmission-side MFP 3, the received data (the RFID data) may not match the data actually written to the RFID tag 39 of the RFID sheet 33A for the reception-side MFP 5 as it may not be possible to write all of the control data due to the RFID tag 39 having a relatively small storage capacity, for example. However, even in such cases, the transmission side can reliably learn what type of RFID sheet 33A on which the original image was duplicated or what RFID data is stored in the RFID tag 39 of the RFID sheet 33A on which the reception-side formed the original images.

(2) In addition to the process described in the preferred embodiment, another method in which the reception-side MFP 5 can transmit the content of RFID data to the transmission-side MFP 3 when the quantity of RFID data is relatively small is to include the RFID data in the NSF signal following the MCF signal sent in response to the EOM signal in (4) of FIG. 3, rather than modifying the communication mode, for example.

(3) While the MFPs 3 and 5 are used as examples in the preferred embodiment, the transmission-side and reception-side devices are not limited to multifunction peripherals and may also be single-function facsimile devices, for example.

What is claimed is:

1. A facsimile communication system comprising:
a first facsimile device configured to transmit image data; and
a second facsimile device comprising:
a first receiving unit configured to receive the image data from the first facsimile device;
an image-forming unit configured to form an image based on the image data received from the first facsimile device on a recording medium having a first storing part storing identification data that identifies the recording medium;
a data reading unit configured to read the identification data from the first storing part in the recording medium on which the image is formed by the image forming unit; and
a notifying unit configured to notify the first facsimile device of the identification data read from the first storing part in the recording medium after the data reading unit reads the identification data from the first storing part in the recording medium on which the image is formed by the image-forming unit,
wherein the first facsimile device transmits created data created by the first facsimile device to the second facsimile device,
wherein the first storing part stores identification data that identifies the recording medium as stored data,
wherein the second facsimile device manages control data and further comprises:
a data reading unit that reads the identification data from the first storing part;
a first data writing unit that writes data to the first storing part; and
a determining unit that determines whether the first storing part is writable or read-only, and
wherein the first data writing unit writes at least one of control data and the created data to the first storing part as the stored data and the notifying unit notifies the first facsimile device of the at least one of the control data and the created data if the determining unit determines that the first storing part is writable, and the notifying unit notifies the first facsimile device of the identification data if the determining unit determines that the first storing part is read-only.

2. The facsimile communication system according to claim 1, wherein the first facsimile device transmits created data created by the first facsimile device to the second facsimile device,
wherein the second facsimile device manages control data and further comprises a first data writing unit that writes at least one of control data and the created data to the first storing part as the stored data, and
wherein the notifying unit notifies the first facsimile device of the at least one of the control data and the created data wrote in the first storing part.

3. The facsimile communication system according to claim 2, wherein the control data includes at least one of unique data identifying the recording medium, data related to a transmission or reception date and time, and transmission data acquired from the first facsimile device.

4. The facsimile communication system according to claim 1, wherein the control data includes at least one of unique data identifying the recording medium, data related to a transmission or reception date and time, and transmission data acquired from the first facsimile device.

5. The facsimile communication system according to claim 1, wherein the notifying unit that notifies correlation data associating the stored data with specification data of the image data.

6. The facsimile communication system according to claim 1, wherein the first facsimile device comprises:
an image scanning unit that scans an original image on an original document having a second storing part to form the image data,
a second receiving unit that receives the stored data from the second facsimile device, and
a second data writing unit that writes the stored data to the second storing part.

7. A facsimile device comprising:

a receiving unit configured to receive image data from a transmission-side facsimile device;

an image-forming unit configured to form an image based on the image data received from the transmission-side facsimile device on a recording medium having a storing part storing identification data identifying the recording medium;

a data reading unit configured to read the identification data from the storing part in the recording medium on which the image is formed by the image-forming unit; and a notifying unit configured to notify the transmission-side facsimile device of the identification data read from the first storing part in the recording medium after the data reading unit reads the identification data from the first storing part in the recording medium on which the image is formed by the image-forming unit, wherein the facsimile device receives created data created by the transmission-side facsimile device, wherein the storing part stores identification data that identifies the recording medium as stored data, wherein the facsimile device manages control data and further comprises:

a data reading unit that reads the identification data from the storing part;

a data writing unit that writes data to the storing part; and a determining unit that determines whether the storing part is writable or read-only, and wherein the data writing unit writes at least one of control data and the created data to the storing part as the stored data and the notifying unit notifies the transmission-side facsimile device of the at least one of the control data and the created data if the determining unit determines that the storing part is writable, and the notifying unit notifies the transmission-side facsimile device of the identification data if the determining unit determines that the storing part is read-only.

* * * * *